W. ROBERTS.
POWER TRANSMITTING ATTACHMENT FOR AUTOMOBILE WHEELS.
APPLICATION FILED JAN. 31, 1917.
1,252,847. Patented Jan. 8, 1918.
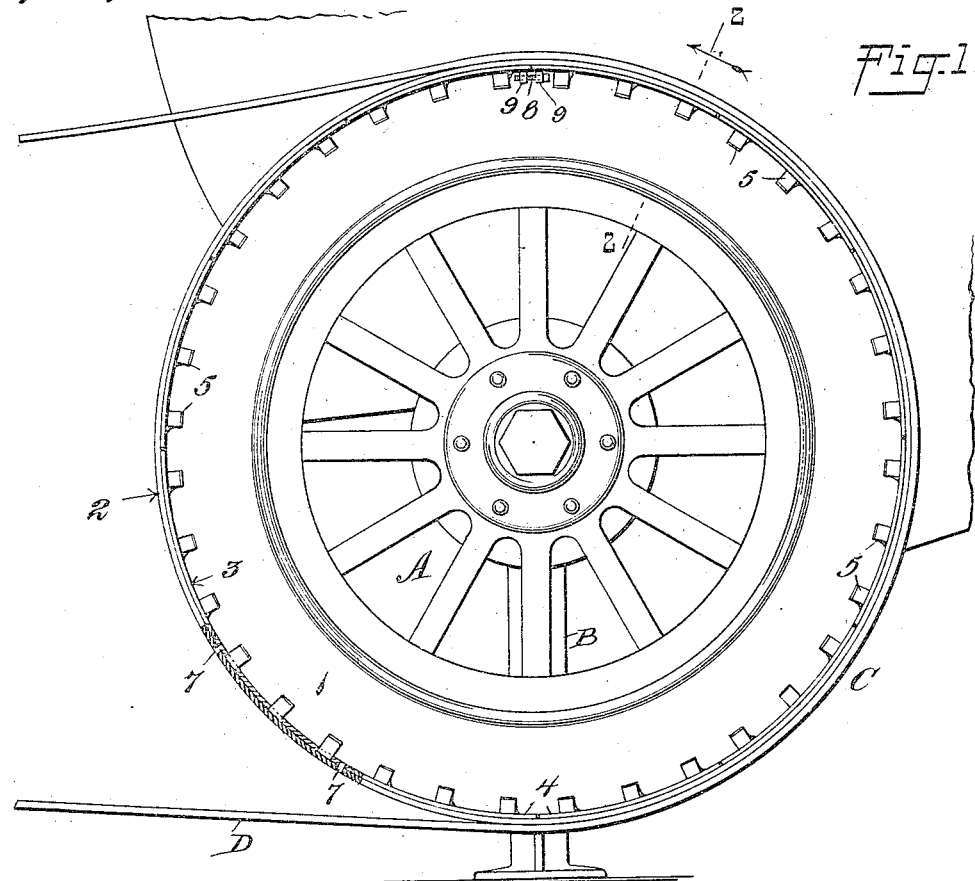
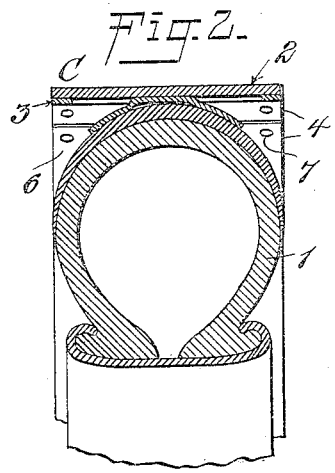
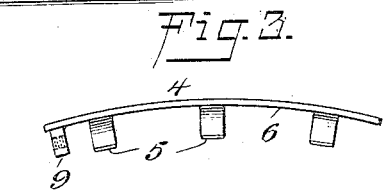
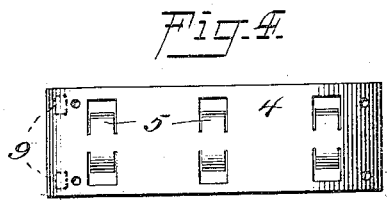
WITNESSES
INVENTOR
W. Roberts.
BY
ATTORNEYS

UNITED STATES PATENT OFFICE.

WILLIAM ROBERTS, OF SPRINGFIELD, OHIO.

POWER-TRANSMITTING ATTACHMENT FOR AUTOMOBILE-WHEELS.

1,252,847.

Specification of Letters Patent.   Patented Jan. 8, 1918.

Application filed January 31, 1917.   Serial No. 145,642.

*To all whom it may concern:*

Be it known that I, WILLIAM ROBERTS, a citizen of the United States, and a resident of Springfield, in the county of Clark and State of Ohio, have invented new and Improved Power-Transmitting Attachments for Automobile-Wheels, of which the following is a full, clear, and exact description.

This invention relates to an attachment adapted to be applied to the tire of a driving wheel of an automobile whereby power can be derived therefrom for any useful purpose while the automobile is standing and the rear axle is raised.

The invention has for its general objects to improve and simplify devices of this character so as to be reliable and efficient in use, comparatively simple and inexpensive to manufacture, and so designed that they can be applied to wheel tires of any diameter, shape or style.

A more specific object of the invention is the provision of an attachment for a wheel tire whereby the wheel is converted into a belt driving pulley, the attachment consisting of a plurality of metal sections of a circle of special form to fit the periphery of the tire, and a flexible strip of leather, canvas or the like to which the sections are riveted, the ends of the attachment being provided with a suitable connector for fastening the ends together circumferentially around the tire, it being understood that the device is applied to the tire while the latter is partially deflated, so that the device can be more easily adjusted.

With such objects in view, and others which will appear as the description proceeds, the invention comprises various novel features of construction and arrangement of parts which will be set forth with particularity in the following description and claims appended hereto.

In the accompanying drawing, which illustrates one embodiment of the invention and wherein similar characters of reference indicate corresponding parts in all the views, Figure 1 is a side view of an automobile wheel with the attachment applied thereto;

Fig. 2 is a sectional view on the line 2—2, Fig. 1;

Fig. 3 is a side view of one of the end metal sections; and

Fig. 4 is a plan view of Fig. 3.

Referring to the drawing, A designates one of the rear wheels of an automobile which is supported off the ground by means of a jack B. The pulley-forming attachment C is applied around the periphery of the tire 1 of the wheel A.

The attachment C is in the form of a circular ring made up of an outer flexible member 2 of leather, canvas or equivalent material, and an inner member 3 made up of a plurality of arcuate sections 4 constructed as shown in Figs. 3 and 4. These arcuate sections are curved to conform to the curvature of the tire circumferentially, but transversely the plates or sections 4 are flat, or approximately so, as shown in Fig. 2. Each section has a plurality of pairs of lugs 5 stamped inwardly from the inner or concave surface 6, and these lugs 5 are curved so as to form saddles of the curvature of the tire transversely so as to rest and fit thereon, as shown in Fig. 2. The sections 4 are fastened to the outer strip of belting 2 by means of rivets 7. The attachment is just long enough to fit circumferentially around the tire, and the ends of the attachment are fastened together by any suitable means, such as bolts 8, Fig. 1, which pass through lugs 9 on the end metal sections 4. If desired the attachment can be made in a plurality of parts and several tightening devices or bolts 8 may be employed to connect the parts together.

The attachment is applied to the tire by being wrapped circumferentially around the same while the tire is only partially inflated. After the attachment has its ends fastened together and is properly positioned on the tire, the latter is fully inflated, whereby the numerous lugs 5 will fit into the outer surface of the tire and prevent the attachment from slipping around when the tire is applied to the driving wheel and a load is being driven. Power is taken off the driving wheel by means of a belt D, which passes around the pulley face formed by the attachment.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. A pulley-forming attachment for an automobile wheel tire, comprising a band-like element composed of a flexible outer member and a plurality of arcuate metal members fastened thereto, and means for fastening the ends of the element together around a tire.

2. A pulley-forming attachment for an automobile wheel tire, comprising a band-like element composed of a flexible outer member and a plurality of arcuate metal members fastened thereto, and means for fastening the ends of the element together around a tire, said metal members being curved to fit the tire circumferentially and having a plurality of lugs bent inwardly to conform transversely to the curvature of the tire.

3. A device of the class described comprising a flexible element adapted to be fastened circumferentially around a tire, said element consisting of a flexible outer member and an inner member fastened thereto and formed of metal sections arranged end to end and curved to fit the tire circumferentially and formed with pairs of lugs stamped from the metal and curved inwardly to fit the tire transversely.

4. A device of the class described comprising a plurality of sheet-like sections arranged end to end and curved to fit a tire circumferentially, each section having a plurality of pairs of lugs on the inner face to transversely fit a tire, and means for fastening the sections together.

WM. ROBERTS.

Witnesses:
C. G. WHITNEY,
C. C. BISHOP.

Copies of this patent may be obtained for five cents each, by addressing the "Commissioner of Patents, Washington, D. C."